United States Patent Office 3,049,542
Patented Aug. 14, 1962

3,049,542
DIAZOMETHYLTRIAZINE DERIVATIVES
Francis Leslie Rose and James Allan Hendry, Manchester, England, assignors to Imperial Chemical Industries Limited, London, England, a corporation of Great Britain
No Drawing. Filed Oct. 31, 1955, Ser. No. 544,081
Claims priority, application Great Britain Nov. 10, 1954
6 Claims. (Cl. 260—248)

This invention relates to new organic compounds and more particularly it relates to new diazomethyltriazine derivatives.

According to the invention we provide the new diazomethyltriazine derivatives of the formula:

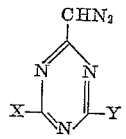

wherein X and Y, which may be the same or different, stand for halogen or for the group OR, SR, NHR or NRR' wherein R and R', which may be the same or different, stand for hydrogen or for a hydrocarbon radical which may optionally bear substituents, R and R' being optionally joined to form, together with the adjacent nitrogen atom, a heterocyclic ring.

As a suitable hydrocarbon radical there may be mentioned for example an alkyl radical which may optionally be substituted for example by an alkylamino, a dialkylamino or a carboalkoxy group and an aryl radical for example a phenyl radical which may optionally be substituted for example by halogen, alkyl, alkoxy, carboxy, carboalkoxy or nitro groups. As a suitable example of R and R' being joined to form, together with the adjacent nitrogen atom, a heterocyclic ring, there may be mentioned for example the ethyleneimino group, the morpholino group and the piperidino group.

According to a further feature of the invention we provide a process for the manufacture of those of the said new diazomethyltriazine derivatives wherein X and Y stand for halogen which comprises reacting a compound of the formula:

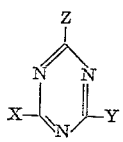

wherein X, Y and Z stand for halogen, with diazomethane.

The reaction may conveniently be carried out in the presence of an inert solvent and a suitable inert solvent may be, for example, ether.

The reaction may also be conveniently carried out in the presence of an acid-binding agent and a suitable acid-binding agent may be for example a weak alkali for example an alkaline carbonate or triethylamine or it may be for example excess of diazomethane.

The reaction may also be conveniently carried out by generation of the diazomethane in situ by the use of, for example, a nitrosomethylamine intermediate for example p-toluenesulphonmethylnitrosamide in the presence of an alkaline reagent.

According to still a further feature of the invention we provide a process for the manufacture of those of the said new diazomethyltriazine derivatives wherein X stands for halogen or for the group OR, SR, NHR or NRR' and wherein Y stands for the group OR, SR, NHR or NRR' wherein R and R' have the meaning stated above, which comprises reacting a compound of the formula:

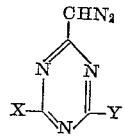

wherein X and Y stand for halogen, with a compound of the formula R"H wherein R" stands for the group OR, SR, NHR, or NRR' wherein R and R' have the meaning stated above.

The reaction may conveniently be carried out in the presence of an inert diluent or solvent and a suitable inert diluent or solvent may be for example benzene, ether, water, methanol or ethanol.

The reaction is preferably carried out in the presence of an acid-binding agent and as suitable acid-binding agents there may be mentioned for example, alkali metal carbonates for example sodium carbonate and potassium carbonate and tertiary amines for example triethylamine. Moreover when one of the reactants of the process is a compound of the formula R"H wherein R" stands for the group NHR or NRR' wherein R and R' have the meaning stated above, the acid-binding agent may conveniently be an excess of the compound of the formula NH₂R or NHRR' wherein R and R' have the meaning stated above and may be for example ammonia, methylamine, dimethylamine or γ-diethylaminopropylamine.

The diazomethyltriazine derivatives of the stated formula possess valuable therapeutic properties and they are useful in pharmaceutical preparations and also as intermediates in the manufacture of other triazine derivatives. Those of the new diazomethyltriazine derivatives wherein X stands for a phenyl radical which may optionally bear substituents and wherein Y stands for a basic alkylamino group, for example 2-diazomethyl-4-p-chlorophenylamino-6-γ-diethylaminopropylamino-1:3:5-triazine, possess antimalarial activity against *Plasmodium berghei* in experimental animals. Moreover certain of the new diazomethyltriazine derivatives and in particular, 2-diazomethyl-4:6-bis-dimethylamino-1:3:5-triazine, sodium 2-diazomethyl-4-phenylamino-6-chloro-1:3:5-triazine - 2' - carboxylate, 2 - diazomethyl-4:6-bis-morpholino-1:3:5-triazine and 2-diazomethyl-4:6-bis-ethyleneimino-1:3:5-triazine, show pronounced activity against tumor growths in experimental animals for example against Walker carcinoma No. 256 in rats and Sarcoma No. 180 in mice.

As stated above, the new diazomethyltriazine derivatives are useful as intermediates. The said diazomethyl group is capable of entering into further reaction with reagents such as those which are known to the art to react with diazomethyl derivatives. There may be mentioned for example the interaction of the said new diazomethyl derivatives with dilute mineral acids to give the corresponding hydroxymethyl derivatives and with compounds containing an acidic hydrogen atom for example with organic carboxylic acids to give the corresponding substituted-methyl esters, with phenols to give the corresponding substituted-methyl ethers and with halo-acids to give the corresponding substituted-methyl halides which compounds are also capable of entering into further reaction as is known in the art. The new diazomethyl derivatives of the invention are also capable of undergoing further reaction for example hydrogenation, treatment with copper oxide and addition to compounds containing unsaturated groups.

The invention is illustrated but not limited by the following examples in which the parts are by weight:

*Example 1*

25 parts of cyanuric chloride are added during 30 minutes to a stirred solution of 13.5 parts of diazomethane in 486.5 parts of ether at 10° C. The mixture is kept at 10° C. for a further 1 hour and is then evaporated to dryness in vacuo. The solid residue can be crystallised from petroleum ether (B.P. 60–80° C.) to give 2-diazomethyl-4:6-dichloro-1:3:5-triazine, as a yellow crystalline solid, M.P. 116–118° C. For convenience in handling and use in subsequent processes of manufacture, the solid residue is stirred with 140 parts of benzene and the mixture is treated with 2.5 parts of charcoal, and 3 parts of calcium chloride and filtered to give a benzene solution of 2-diazomethyl-4:6-dichloro-1:3:5-triazine.

*Example 2*

30 parts of an aqueous 30% methylamine solution are added to a stirred benzene solution of 2-diazomethyl-4:6-dichloro-1:3:5-triazine, obtained from 9.2 parts of cyanuric chloride by the process as described in Example 1, at 20–40° C. The mixture is then filtered and the solid residue is washed with small portions of water, then methanol and then benzene. There is thus obtained 2-diazomethyl-4-methylamino-6-chloro-1:3:5-triazine, M.P. 217° C. with decomposition.

*Example 3*

To a stirred solution of 13.8 parts of anhydrous potassium carbonate in 90 parts of water at 20° C. there are added 9.5 parts of 2-diazomethyl-4:6-dichloro-1:3:5-triazine in 90 parts of benzene, followed immediately by 7.5 parts of p-chloroaniline in 36 parts of benzene. The mixture is then heated at 40° C. during 2 hours and is then cooled and filtered. The solid residue is crystallised from methanol to give 2-diazomethyl-4-p-chloroanilino-6-chloro-1:3:5-triazine, M.P. 193° C. with decomposition.

*Example 4*

100 parts of a benzene solution of 2-diazomethyl-4:6-dichloro-1:3:5-triazine, obtained from 9.2 parts of cyanuric chloride and 4.7 parts of diazomethane by the process as described in Example 1, are stirred at 20° C. during 2 hours with a solution of 10 parts of anthranilic acid in 110 parts of water and 16 parts of anhydrous sodium carbonate. The mixture is then filtered and the solid residue is dissolved in 500 parts of water and stirred with charcoal and filtered. To the filtrate are added 250 parts of crystalline sodium acetate and the mixture is then filtered. The solid residue is crystallised from aqueous methanol to give sodium 2-diazomethyl-4-phenylamino-6-chloro-1:3:5-triazine-2'-carboxylate as a colourless crystalline solid.

*Example 5*

100 parts of a benzene solution of diazomethyl-dichloro-triazine, obtained from 9 parts of cyanuric chloride by the process as described in Example 1 are added during 10 minutes to a stirred solution of 25 parts of ammonia (density=0.88) and 25 parts of water maintained at 10–15° C. The mixture is kept at 15° C. during a further 30 minutes and is then filtered. The solid residue is extracted with 300 parts of hot benzene and the extract is evaporated to dryness in vacuo. There is thus obtained 2-diazomethyl-4-amino-6-chloro-1:3:5-triazine, M.P. 174° C. with decomposition.

*Example 6*

To 100 parts of a stirred benzene solution of 2-diazomethyl-4:6-dichloro-1:3:5-triazine, obtained from 9.2 parts of cyanuric chloride and 5 parts of diazomethane, by the process as described in Example 1, at 5–7° C. there are added 16.5 parts of aqueous 30% dimethylamine. The benzene layer is then separated and washed with water and dried. The benzene solution is evaporated to dryness in vacuo and the residue is then crystallised from ethanol. There is thus obtained 2-diazomethyl-4-dimethylamino-6-chloro-1:3:5-triazine, M.P. 103° C.

*Example 7*

A mixture of 5 parts of 2-diazomethyl-4-amino-6-chloro-1:3:5-triazine and 10 parts of γ-diethylaminopropylamine is stirred at 60–65° C. during 15 minutes and is then diluted with water. The mixture is extracted with 80 parts of benzene and in two portions and the combined benzene extracts are washed with water and dried. The benzene solution is passed through activated alumina. The alumina is then treated with benzene containing 2% methanol and the benzene-methanol solution so obtained is evaporated to dryness in vacuo to give 2-diazomethyl-4-amino-6-γ-diethylaminopropylamino-1:3:5-triazine, M.P. 107–108° C. with decomposition.

*Example 8*

A mixture of 10 parts of 2-diazomethyl-4-p-chloroanilino-6-chloro-1:3:5-triazine and 12 parts of γ-diethylaminopropylamine is stirred at 60–65° C. during 20 minutes and is then cooled. 50 parts of benzene and 50 parts of water are then added to the mixture and the benzene layer is then separated, washed with water and dried over anhydrous sodium sulphate. The benzene solution is passed through activated alumina and the alumina is then treated with benzene containing 1–2% of methanol. The benzene-methanol solution so obtained is evaporated to dryness in vacuo below 40° C. The residue is stirred with a small portion of petroleum ether (B.P. 40–60° C.) and is then filtered. There is thus obtained 2-diazomethyl-4-p-chloranilino-6-γ - diethylaminopropylamino-1:3:5-triazine, as yellow solid, M.P. 86–7° C.

*Example 9*

6.6 parts of 2-diazomethyl-4-methylamino-6-chloro-1:3:5-triazine and 15 parts of γ-diethylaminopropylamine are mixed at 20° C. and the mixture is then stirred together at 60–65° C. during 10 minutes. The mixture is then diluted with water and is extracted with benzene. The benzene extract is washed with water and dried and is then passed through activated alumina. The alumina is then treated with benzene containing 2% methanol and the benzene-methanol solution so obtained is evaporated to dryness in vacuo. The residue is crystallised from petroleum ether (B.P. 40–60° C.) and there is thus obtained 2-diazomethyl-4-methylamino-6-γ-diethylaminopropylamino-1:3:5-triazine, M.P. 50–51° C.

*Example 10*

A mixture of 9.2 parts of 2-diazomethyl-4-methylamino-6-chloro-1:3:5-triazine and 45 parts of aqueous 30% dimethylamine is stirred at 50° C. during 1 hour and is then cooled and filtered. The solid residue is dissolved in hot ethanol and the solution is then cooled immediately and filtered. The solid residue thus obtained is 2-diazomethyl-4-methylamino-6-dimethylamino - 1:3:5-triazine, M.P. 118–120° C. with decomposition.

*Example 11*

A mixture of 5 parts of 2-diazomethyl-4-p-chloranilino-6-chloro-1:3:5-triazine and 25 parts of aqueous 30% dimethylamine is stirred at 40–45° C. during 1 hour and is then filtered. The solid residue is washed with water and dried and is then crystallised from methanol to give 2 - diazomethyl-4-p-chloranilino-6-dimethylamino-1:3:5-triazine, M.P. 153° C. with decomposition.

*Example 12*

A benzene solution of 2-diazomethyl-4:6-dichloro-

1:3:5-triazine, obtained from 11 parts of cyanuric chloride by the process as described in Example 1, is added to 40 parts of aqueous 30% dimethylamine solution stirred at 40° C. and the mixture is then stirred for a further 2 hours. The benzene layer is separated and is then washed with water and dried over calcium chloride. The benzene solution is evaporated in vacuo below 40° C. The residue is crystallised from ethanol to give 2-diazomethyl-4:6-bis-dimethylamino - 1:3:5-triazine, M.P. 94° C.

*Example 13*

A benzene solution of 2-diazomethyl-4:6-dichloro-1:3:5-triazine, obtained from 8.6 parts of cyanuric chloride by the process as described in Example 1 is added to a mixture of 7 parts of ethyleneimine and 16 parts of triethylamine in 40 parts of benzene at 10° C. The mixture is then stirred during 3.5 hours and is then filtered. The filtrate is evaporated to dryness in vacuo below 30° C. The residue is extracted in a Soxhlet apparatus with 200 parts of petroleum ether (B.P. 40–60° C.) during about 6 hours. The extract is then filtered and the solid residue is crystallised from a mixture of ethyl acetate and petroleum ether (B.P. 60–80° C.) to give 2-diazomethyl-4:6-bis-ethyleneimino-1:3:5-triazine, as a yellow crystalline solid, M.P. 120° C. with decomposition.

*Example 14*

To a stirred solution of 42 parts of glycine ethyl ester hydrochloride in 150 parts of water there are added 150 parts of 2 N aqueous sodium hydroxide solution followed by 250 parts of a benzene solution of 2-diazomethyl-4:6-dichloro-1:3:5-triazine obtained from 22.4 parts of cyanuric chloride by the process as described in Example 1. The reaction mixture is stirred at 35–40° C. for 2 hours and is then cooled and filtered. The solid residue is crystallised from methanol to give 2-diazomethyl-4-carbethoxymethylamino-6-chloro-1:3:5 - triazine, M.P. 153° C. with decomposition.

*Example 15*

10 parts of 2-diazomethyl-4-carbethoxymethylamino-6-chloro-1:3:5-triazine are ground with 50 parts of 30% aqueous dimethylamine solution. The mixture so obtained is filtered and the solid residue is washed with water and then crystallised from methanol. There is thus obtained 2 - diazomethyl - 4-carbethoxymethylamino-6-dimethylamino-1:3:5-triazine, M.P. 138° C. with decomposition.

*Example 16*

A mixture of 5 parts of 2-diazomethyl-4-carbethoxymethylamino-6-chloro-1:3:5-triazine, 3.6 parts of the sodium salt of p-nitrothiophenol and 50 parts of ethanol is stirred at 60–65° C. for 15 minutes. The mixture is then cooled and diluted with 100 parts of water and filtered. The solid residue is washed well with water and is then crystallised from methanol to give 2-diazomethyl-4-carbethoxymethylamino - 6-p-nitrophenylmercapto-1:3:5-triazine, M.P. 131° C. with decomposition.

*Example 17*

60 parts of a benzene solution of 2-diazomethyl-4:6-dichloro-1:3:5-triazine, obtained from 10.4 parts of cyanuric chloride by the process as described in Example 1, are added gradually to a stirred solution of 22 parts of morpholine in 60 parts of water at 35–40° C. The reaction mixture is stirred at 35–40° C. for a further 2 hours and is then cooled and filtered. The solid residue is crystallised from benzene to give 2-diazomethyl-4:6-bis-morpholino-1:3:5-triazine, M.P. 198° C. with decomposition.

*Example 18*

60 parts of a benzene solution of 2-diazomethyl-4:6-dichloro-1:3:5-triazine, obtained from 10.4 parts of cyanuric chloride by the process as described in Example 1, are added gradually to a stirred solution of 22 parts of piperidine in 60 parts of water at 35–40° C. The reaction mixture is stirred at 35–40° C. for a further 2 hours and the benzene solution is then separated from the aqueous phase. The benzene solution is evaporated to dryness in vacuo and the residue is crystallised from petroleum ether (B.P. 80–100° C.). There is thus obtained 2-diazomethyl-4:6-bis-piperidino-1:3:5-triazine, M.P. 108° C. with decomposition.

*Example 19*

A mixture of 5.6 parts of 2-diazomethyl-4-p-chloranilino-6-chloro-1:3:5-triazine and a sodium methoxide solution, obtained by dissolving 0.92 part of sodium in 40 parts of methanol, is heated to the boil and is then heated under reflux for 30 minutes. The methanol is then removed in vacuo and the residue is slurried with a solution of 1 part of ammonium chloride in 50 parts of water. The mixture is then extracted with ether and the ether extract is dried over anhydrous sodium sulphate and filtered. The ether extract is then evaporated in vacuo to give 2 - diazomethyl-4-p-chloranilino-6-methoxy-1:3:5-triazine, M.P. 170° C. with decomposition.

*Example 20*

A mixture of 10 parts of 2-diazomethyl-4-amino-6-chloro-1:3:5-triazine and 50 parts of 30% aqueous dimethylamine solution is stirred at 40–45° C. for 15 minutes. The mixture is then cooled and filtered. The solid residue is crystallised from methanol to give 2-diazomethyl - 4 - amino - 6-dimethylamino-1:3:5-triazine, M.P. 152° C. with decomposition.

*Example 21*

When the 50 parts of 30% aqueous dimethylamine solution are replaced by 50 parts of 30% aqueous diethylamine solution in the process as described in Example 20, there is thus obtained, in a similar manner 2-diazomethyl-4-amino-6-diethylamino-1:3:5-triazine, M.P. 147–8° C. with decomposition.

*Example 22*

A mixture of 3.4 parts of 2-diazomethyl-4-amino-6-chloro-1:3:5-triazine, 3.7 parts of the sodium salt of p-nitrophenol and 80 parts of methanol is heated gently under reflux for 30 minutes. The mixture is then filtered, the solid residue is washed with methanol and with water and is then crystallised from β-ethoxyethanol. There is thus obtained 2 - diazomethyl - 4-amino-6-p-nitrophenylmercapto-1:3:5-triazine, M.P. 223° C. with decomposition.

*Example 23*

A mixture of 3.4 parts of 2-diazomethyl-4-amino-6-chloro-1:3:5-triazine and a sodium methoxide solution, obtained from 0.46 part of sodium and 20 part of methanol, is heated under reflux for 15 minutes. The mixture is then cooled and filtered and the filtrate is evaporated to dryness in vacuo. The solid residue is washed with water and is then crystallised from methanol to give 2-diazomethyl-4-amino-6-methoxy-1:3:5-triazine, M.P. 184° C. with decomposition.

*Example 24*

To a solution of sodium methoxide, prepared from 2.3 parts of sodium and 155 parts of methanol, there are added 6.2 parts of ethyl mercaptan followed by 17 parts of 2-diazomethyl-4-amino-6-chloro-1:3:5-triazine. The mixture so obtained is heated under reflux for 15 minutes and is then cooled and filtered. The filtrate is evaporated to dryness in vacuo and the solid residue is slurried with water and refiltered. The solid residue is then crystallised from methanol to give 2-diazomethyl-4-amino-6-ethylmercapto-1:3:5-triazine, M.P. 202° C. with decomposition.

What we claim is:
1. New diazomethyltriazine derivatives of the formula:

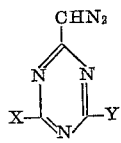

wherein X and Y are selected from the group consisting of halogen, OR, SR, NHR and NRR' wherein R and R' are selected from the group consisting of hydrogen, lower alkyl, carboalkoxy lower alkyl, dialkylamino lower alkyl, phenyl, halophenyl, nitrophenyl, phenyl substituted with a carboxylic acid group and, where R and R' are joined together with the adjacent nitrogen atom, ethylene imino, piperidino and morpholino.
2. 2-diazomethyl-4:6-dichloro-1:3:5-triazine.
3. 2-diazomethyl-4:6-bis-ethyleneimino-1:3:5-triazine.
4. 2-diazomethyl-4:6-bis-dimethylamino-1:3:5-triazine.
5. 2 - diazomethyl - 4 - p - chloranilino - 6 - chloro - 1:3:5-triazine.
6. 2 - diazomethyl - 4 - p - chloranilino - 6 - γ - diethylamino-propylamino-1:3:5-triazine.

References Cited in the file of this patent
UNITED STATES PATENTS
2,867,621    Grundmann et al. _____ Jan. 6, 1959

OTHER REFERENCES

Meyer et al.: J. Prakt., Chem., vol. 82 (NF Series), page 531 (1910).
Geschickter: J. A. M. A., Feb. 1, 1930, pages 326–28.
J. A. M. A., vol. 94, Nov. 23, pages 1845, 1864, 1865, June 7, 1930.
Kaplan: Am. J. Cancer, January 1932, pages 210–13.
Bachmann et al.: Organic Reactions, vol. 1, pages 38–41, and 47–52, John Wiley and Sons Inc., (1942).
Thurston et al.: J. Am. Chem. Soc., vol. 73 pages 2981–92 and 2995 (1951).
Grundmann et al.: J. Am. Chem. Soc., vol. 79, pages 944–8 (1957).
Hendry et al.: J. Chem. Soc., 1958, pages 1134–40.